(No Model.) 4 Sheets—Sheet 3.

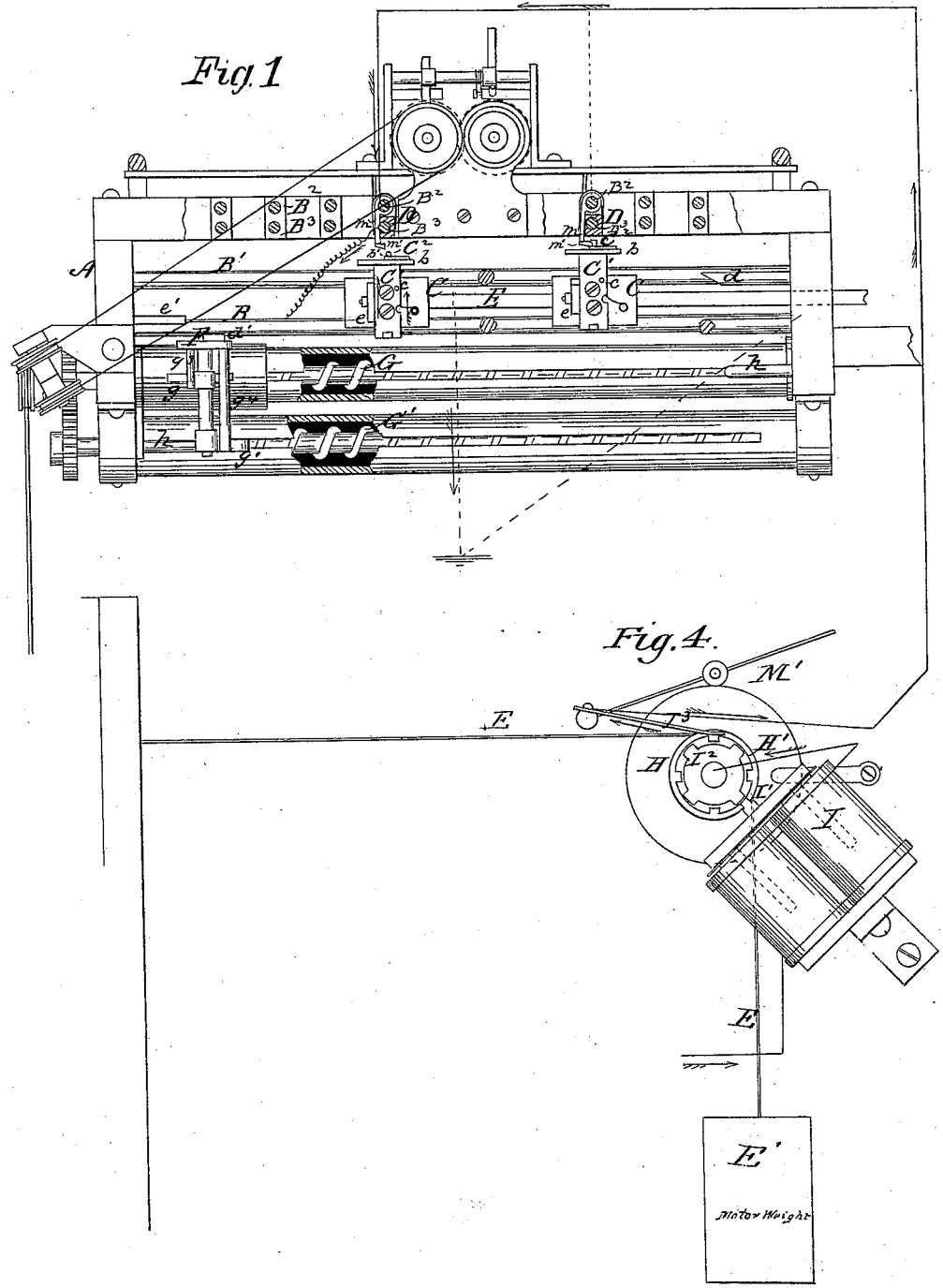

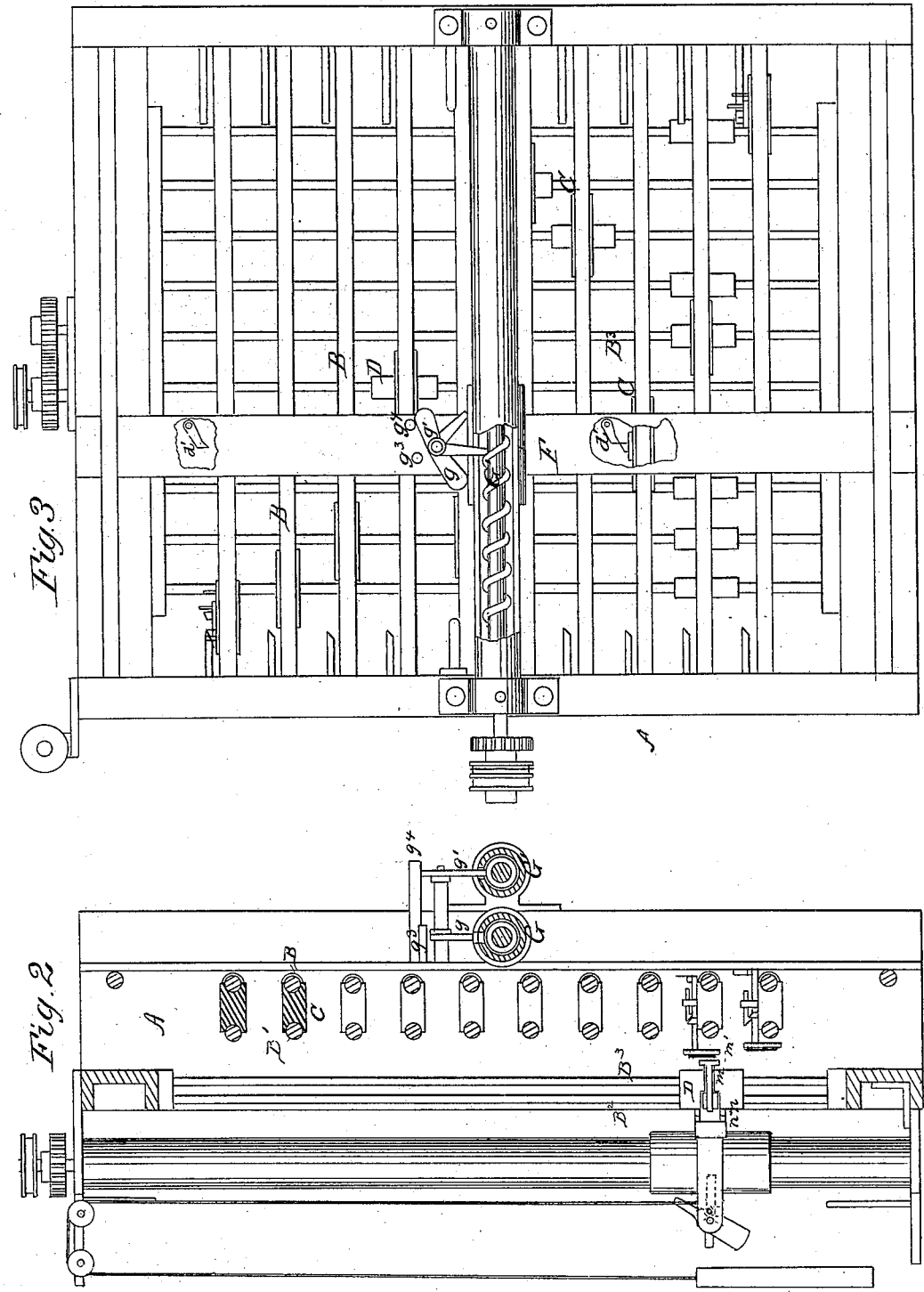

T. A. CONNOLLY.
AUTOMATIC ELECTRIC SWITCH.

No. 295,356. Patented Mar. 18, 1884.

Witnesses
Jos. B. Connolly
A. A. Connolly

Inventor
Thos. A. Connolly (No Model.)　　　　　T. A. CONNOLLY.　　　　4 Sheets—Sheet 4.
AUTOMATIC ELECTRIC SWITCH.

No. 295,356.　　　　　　　Patented Mar. 18, 1884.

Witnesses
Jos. B. Connolly
A. A. Connolly

Tho. A. Connolly
Inventor
By Connolly Bro.
Att'ys

UNITED STATES PATENT OFFICE.

THOMAS A. CONNOLLY, OF WASHINGTON, DISTRICT OF COLUMBIA.

AUTOMATIC ELECTRIC SWITCH.

SPECIFICATION forming part of Letters Patent No. 295,356, dated March 18, 1884.

Application filed April 10, 1883. (No model.)

*To all whom it may concern:*

Be it known that I, THOMAS A. CONNOLLY, a citizen of the United States, residing at Washington, in the District of Columbia, have invented certain new and useful Improvements in Automatic Electrical Switches; and I do hereby declare that the following is a full, clear, and exact description of the invention, which will enable others skilled in the art to which it appertains to make and use the same, reference being had to the accompanying drawings, which form a part of this specification, in which—

Figure 5:
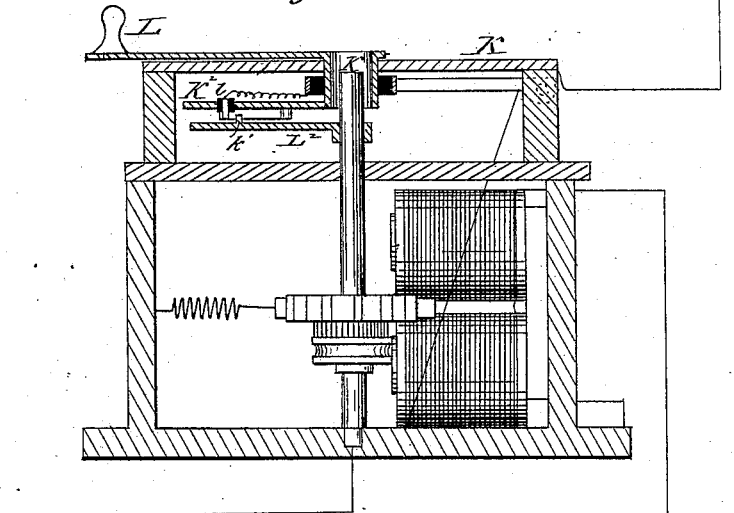
Figure 6:
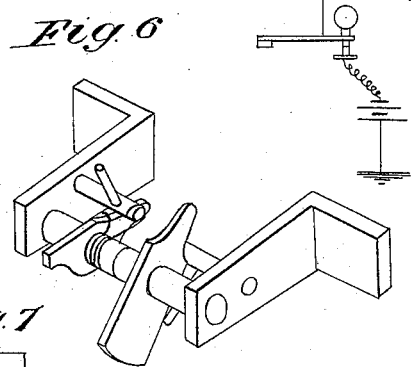
Figure 7:
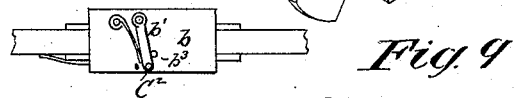
Figure 8:
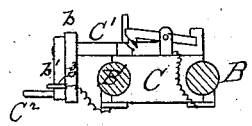
Figure 9:
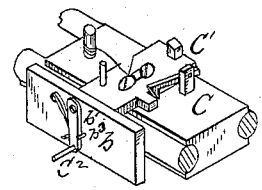
Figure 10:
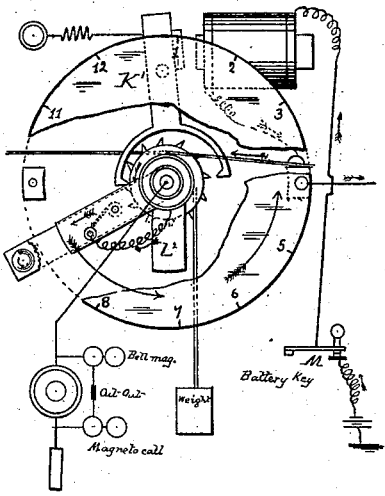

Figure 1 is a top view of an automatic switch-board, partly dissected. Fig. 2 is a vertical transverse section of same. Fig. 3 is a front elevation. Fig. 4 is a side view, showing the circuit-breaker and electro-magnetic detent of one of the lines at the central apparatus. Fig. 5 is a central section of the subscriber's box. Figs. 6, 7, 8, and 9 are detail views. Fig. 10 is a face view of the subscriber's local apparatus, with portion broken away to show hidden parts.

This invention has relation to automatic switches for electric systems, and particularly for telephonic exchanges, wherein are included a large number of subscribers' lines so disposed and arranged that they may be connected together in pairs for intercommunication.

In Letters Patent No. 222,458, December 9, 1879, are shown a system and mechanism for automatic telephone-exchange purposes in which the central-office switching apparatus consists of a cylindrical machine, to which lead the terminals of the various subscribers' lines. Each line employs an upright conductor contact-bar, to which, when a line is passive, connection is made through devices included in an operating-line, and a rotary conducting point or finger, by which, when the line is operating to reach another line, connection is made with a passive line. In the system shown in said patent the mechanical operations necessary to effect the connections and disconnections are produced by electro-magnetic contrivances, and the motions are such as are usual in electro-magnetic motors—that is, impulsive or step by step—each movement being caused by the energizing and de-energizing of an electro-magnet. In the system and apparatus which is the subject of this application the rotary principle—that is, the travel of a conducting point or finger around a center—is discarded, and instead thereof a rectilinear movement is employed, the conducting-point "plug" or terminal being moved in a straight line—preferably horizontal—so as to make contact at various points in its path with suitable conductors at right angles thereto. Again, the electro-magnetic appliances for producing the requisite movement of parts are dispensed with, the mechanical operations being accomplished by means of any suitable motive power, and the electro-magnetic appliances employed merely for the purpose of controlling detents which hold certain movable parts in check, except when they are required to move, and for the purpose of causing certain registration at the subscribers' stations, in order that given lines may be selected and communication effected therewith.

This invention consists, broadly, in such construction and combination of parts as will give effect to an automatic switching system, in which, first, the ordinary switch-board construction is employed—i. e., the conducting or terminal bars arranged in right lines and intersecting each other; second, the mechanical operations are effected by any suitable motive power and controlled by electro-magnetic detents; third, the movement of parts is continuous when in action—that is, non-intermittent or step by step.

As shown in the accompanying drawings, the switching mechanism is modeled to conform in many respects with the conventional electric switch-board in common use, and may be termed an automatic "switch-board," since it maintains an analogous or similar relationship of intersecting horizontal and vertical conducting-bars secured to a suitable frame, A. The horizontal and vertical conducting or terminal bars B B' B² B³ are rigid, as in the common switch-board. The conducting point or plug C, however, is movable, and slides or moves along its horizontal conductor-bars from end to end, and in so doing traverses or crosses in its path the vertical conducting-bars of every other line in the switch-board. It may be stopped in front of or opposite any of such vertical bars. While traveling along said horizontal bars (each line having two such bars, B B', supporting the plug or connecting-block) the latter maintains an electric connection and circuit through the former, one of which is the terminal of ground or a return, the other being in the line. When the plug or block C is stopped in front of the vertical bar of an intersecting line, and a connection therewith effected, the central-office grounds of both lines are temporarily broken and a circuit established through both main lines. The conducting block or plug carries the equivalent of the ordinary switch-board plug or pin, and would, by merely coming in contact with a vertical conductor, establish a circuit therethrough; but for the purpose of rendering the automatic switch apparatus more serviceable each pair of vertical conductors is provided with a traveling block, D, which corresponds in its uses with the plug-holes of a common switch, and which, while in motion up and down, intersects every pair of horizontal conducting-bars. Excepting when in actual use, the vertical bars are constantly moving up and down. Such blocks carry devices for electrically connecting the bars upon which they move, one bar leading to ground and the other to line. A connection is made from one line to another when a horizontally-traveling conducting-block stops opposite a pair of vertical bars and allows the vertically-traveling block thereof to coincide with it. The effect of this coincidence of blocks is, first, the stopping of the vertical block in its travel; secondly, the metallic or electric contacting of the two lines; and, thirdly, the breaking of the central or switch-board ground of both lines.

The mechanical operations by which the requisite movement of the parts referred to is effected are independent of electro-magnetic power, and may be obtained from any suitable motor which will give a continuous rotary motion of sufficient power. The whole automatic switch-board system has in view and is based on the employment of a non-magnetic motor, from which can be gained the requisite power in a reliable and comparatively inexpensive way, and thus obviate the many difficulties and expenses incident to a use of and dependence upon electro-magnetic power—such, for instance, as was contemplated in the systems shown in the patent referred to.

The movement of the conducting-block may be obtained in various ways, but it is preferred to have the horizontal blocks drawn in one direction by a cord or tape, E, and a weight, E', and in the reverse direction by a sweep, F, caused to travel to and fro by means of two screws or worms, G G', geared together and turning in opposite directions, the sweep being provided with automatic mechanism for alternately shifting its engagement from one screw to the other at the ends of the screws, such mechanism consisting of weighted levers $g$ $g'$, abutting against stops $g^3$ $g^4$, and deflected into the screws by studs $h$ on the frame A. The horizontal block C has a slide, C', which carries a pin, $c$, and which, when the former reaches the end of its path, comes in contact with a beveled pin, $d$, and is thereby automatically shifted so as to intercept a click or dog, $d'$, on the sweep, which will only catch it on one side, but which, having caught it, will carry the block back to its starting-point and leave it there. When this slide is shifted out, it is held in engagement with the sweep by a pawl or catch, $e$, and when the block reaches its home position this pawl or catch is automatically lifted or released by another beveled pin, $e'$, from the slide, and the latter thrown out of the path of the sweep. The block is allowed to move from its home position to the farther end of the switch-board without meeting the sweep, although the latter is continuously traveling to and fro, and sometimes passing the block; and while the slide is out the conducting pin or plug $C^2$, which is attached to it, is in position for making contact with the vertical blocks. When the block is being carried back by the sweep, the retracted position of the slide prevents any such contact, and the block will be restored to its home position without obstruction or impediment.

The same substantial arrangement and use of a pair of geared screws or worms, and a sweep is used for moving the vertical blocks; but the latter are moved in both directions by the sweep by means of suitable connections, which are released from the sweep when the blocks are arrested in their movement. The two pairs of screws are connected by cords and pulleys, and operated from the one motor, as shown, although they may be operated separately.

The only necessary use made on the switch-board of electro-magnetic appliances is to release the weighted cords or tapes, so that the horizontal blocks will be moved thereby, and to arrest and hold the same when a line sought for has been reached. There are various ways of applying electro-magnetism with this object in view. For instance, as shown in the drawings, the cord or tape may pass over a pulley, H, on the shaft of which is a notched wheel, H', the notches corresponding with—that is, being the same distance apart or registering with—the vertical conducting-bars. An electro-magnet, I, near said wheel, carries on its armature a pin or stud, I', which is adapted to fit into these notches when not attracted, and which, when in one, stops the cord and weight and prevents the block from moving. Another wheel, I², on said shaft has conducting points or teeth, and makes and breaks the circuit of the operating-line through the medium of a contact spring or brush, I³, the makes occurring when the stud on the armature is opposite the notches in the notched wheel, and the breaks occurring at the intervening points. If now an operating-current be on the line, a break will happen between every two notches in the wheel H, as the cord turns the pulley and with it the notched wheel. Accordingly a make will occur at every notch.

Now, by means of a suitable electro-magnetic device at a subscriber's box, a registration of these makes and breaks will be obtained, and the position of the horizontal block in its path determined. The intermittence of the current, however, in no way affects the movement of the block, which continues uninterruptedly, its coincidence with each line appearing in the registering-dial of the subscriber, the breaks in the current occurring at points when the armature-stud cannot engage with the notched wheel to stop it. A stoppage of the block can only be effected by breaking the current at the subscriber's box at a point in the registration where otherwise the current would be complete—that is, at a point coinciding with the opposition of the armature-stud to a notch. If a break be made at such a point, the armature will be released, and the stud entering the notch immediately opposite will stop the wheel, and with it the cord, weight, and block. For the purpose of effecting this break at proper points, the hub K of the dial K' in the subscriber's box carries a hand or index, K², terminating in a pivoted switch, k, which is normally in the path of the operating-circuit. Another hand or index, L, connected therewith is arranged so that it can be turned to any point on the face of the numbered dial, whose numbers correspond with the number of subscribers to the exchange. Another hand, L², on the shaft of the escapement-wheel carries a stud or pin, k', which is in the path of movement of the first-mentioned hand. An insulated contact-point, l, on the latter is the terminal of an operating-battery, and pin k' is the terminal of the ground-line leading through the telephone or telephone cut-out to ground.

In the operating-line between the hand and the battery is a key, M, wherewith circuit may be closed and opened. Now, when a given line is to be obtained, the hand carrying the switch is moved around to the corresponding number and there allowed to remain. The key is now closed, and a current immediately thrown on the line. The armature at the switch-board magnet is attracted and the weight moves, drawing the cord and the horizontal block. As the makes and breaks occur by the turning of the make-and-break wheel, the escapement is actuated, and the hand L² turns correspondingly until it reaches the switch on the hand K², whereupon the switch is shifted and the battery cut off, the line being diverted to ground. Instantly the armature at the switch-board is released and catches the wheel, thus arresting the movement of the block opposite the line corresponding with the number on the dial where the setting-hand has been put. If the line sought is not engaged, the vertical block thereof, in short course of time—almost immediately—arrives opposite the stationary horizontal block, and connection is established. If the sought line is engaged, the caller or seeker, failing to get a response to a signal, may turn the setting-hand on his box to zero, and allow his block to go home, or he may wait till such time as the stationary or engaged vertical block is released and comes to him, which it will do eventually.

The pulley over which runs the cord by which the horizontal block is drawn is connected to the make-and-break wheel, and the notched wheel by pawl-and-ratchet connection, so that it turns when the block is being restored to its home position without turning said notched make-and-break wheels. A fan or flutter wheel, M', governs the speed of the pulley and connections.

The arrival of the block at the farther end of the switch-board is indicated at the subscriber's box by the zero-point, where the circuit is normally inactive; hence the return of the block to home is a purely mechanical operation, brought about automatically, and, as a matter of course, by the sweep.

After connection is established between two lines, signals are interchanged by means of electro-magnetic or magneto-electric bells, the magnets thereof being in the circuit and located at the subscribers' boxes. The signaling-current should be of less strength than the operating-currents, so as not to affect the switch-board magnets; or, if the switch-board magnets be polarized, as they may be, the signaling-current should be of opposite polarity, and the magnets adjusted to respond accordingly.

The electric generator for signaling should be in the telephone ground-circuit if the differential currents are employed; but if currents of opposite polarities are to be used, the one generator for each line will answer by suitable arrangement of box-switches.

The proper contact of two lines can be effected by various mechanical expedients, some of which I purpose making the subject of other applications, including other details of construction not necessary to here particularize. The drawings illustrate one means of effecting such connection, viz: The slide C' is provided with a head-piece, b, carrying a spring or a suitable lever, b', which holds the contacting-stud C². Normally, circuit is made from line-bar B through this spring, and by way of a stop-pin, b, to "ground-bar" B', the spring or lever b' being attached to an insulating-base, as by making the head-piece b of hard rubber. The vertical slide D carries a spring-lever, m, having a beveled head, m', which may be slightly notched in the middle of its beveled portion. The back portion of the lever embraces and slides on and in contact with the vertical bar B², which is in the direct path of the incoming line to which such bar belongs. The forward portion lies normally against and rubs along the bar B³, whence the circuit leads through the horizontal bars of same line normally to ground. Now, when a given line has its horizontal block stopped in front of the vertical bars of another line, the contacting-stud c will intercept the lever $m$ and shift it slightly, so as to break its connection with the bar $B^3$. The block or slide D will then stop. At the same time the lever or spring $b'$ will be sufficiently moved to break its circuit or contact with stud $b^3$, thus cutting off circuit to ground. Thus a circuit is established between the two lines. The simplest method of providing such an engagement between the vertically-moving sweep and the blocks D is close frictional contact, the two surfaces being cushioned with rubber $n$ $n$, and the impact just strong enough to cause the blocks to move with the sweep when unresisted by the devices on the horizontal block.

To prevent the entrance of a calling line through the vertical block of another calling line whose horizontal block has left home, I purpose using an automatic switch, which will provide a temporary ground for the intruding line without affording a circuit to the line such intruding line is seeking; but as this switch will form the subject of a separate application, I do not herein describe its construction or operation.

The heads $m'$ of the levers $m$ should be covered on their reverse sides with some non-conducting material, so that a horizontally-moving block will not obtain a circuit through said levers if the conducting-stud $c$ should come in contact therewith while traveling to another line.

What I claim as my invention is—

1. In a switching apparatus for connecting independent electric lines, the combination, with a series of terminal connecting devices moving independently in right lines, of mechanism for automatically effecting said movement and electro-magnetic devices for controlling the same.

2. In a switching apparatus for connecting independent electric lines, the combination, with terminal connecting devices moving in right lines, of rigid conducting-supports upon which said devices travel, and mechanism for automatically effecting the movement of said devices and controlling the same.

3. In a switching apparatus for connecting independent electric lines, the combination of two series of connecting terminals or terminal devices moving in intersecting right lines, with mechanism for effecting the automatic movement of said devices and controlling the same.

4. In a switching apparatus for connecting independent electric lines, the combination, with a series of terminal connecting devices moving in right lines, of a sweep constructed and adapted to move to and fro and to engage with and propel said connecting devices.

5. The combination, in an automatic circuit-changer or electric switch, of slides, blocks, or carriages carrying electric connecting devices, tracks, bars, or supports for the same to travel upon, mechanism for propelling said slides, blocks, or carriages, and electro-magnetic devices for controlling the movement of the same.

6. In an automatic circuit-changer or electric switch, the combination of a rotary screw or worm with a sweep operated thereby, and designed and adapted to be moved by said screw, substantially as described.

7. The combination of a screw or worm, a sweep geared thereto, and a sliding or moving switch-block, slide, or carrier operated upon by said sweep.

8. The combination of a pair of geared screws or worms turning in opposite directions, a sweep propelled by said screws alternately, and automatic devices for shifting the connection of said sweep from one screw or worm to the other.

9. A local-station apparatus for the control of automatic electric switches, comprising means for the transmission of an electric current to the switch and means for registering intermissions in said current produced at or by the switch.

10. In a local-station apparatus for automatic electric switches, the combination, with mechanism for registering intermissions in the current produced at or by the switch, of means for automatically diverting or opening the circuit when a given line is reached.

11. An electric switching apparatus provided with intersecting switch-bars, movable connecting devices to establish connection between said bars, mechanism for causing said devices to travel to and stop at given or predetermined points, devices through which an electric current coming from a distant station is caused to control the movement of said mechanism and allow said connecting devices a continuous movement between any given points, and means whereby the movement of the connecting devices effects a registration thereof at a distance.

12. The combination, in an electric switch, of a series of carriers moving in right lines, and another series of carriers moving also in right lines and intersecting the first-named lines, with mechanism for moving and stopping said carriers and connecting the same with electric lines, whereby when one of said carriers engages with another an electric circuit is established between the lines to which said engaged carriers belong, substantially as described.

13. In an automatic electric switch, a traveling connecting-block adapted to travel forward and backward in the same plane, and provided with devices in circuit with a given line for obtaining contact with and circuit to another line.

In testimony that I claim the foregoing as my own I have hereto affixed my signature in presence of two witnesses.

THOMAS A. CONNOLLY.

Witnesses:
   JOS. B. CONNOLLY,
   A. A. CONNOLLY.